April 21, 1931.  W. A. CHRYST  1,801,587
HYDRAULIC SHOCK ABSORBER OF DOUBLE-ACTING OPPOSED CYLINDER TYPE
Filed May 3, 1928  2 Sheets-Sheet 1

Inventor
William A. Chryst
By Spencer, Hardman and Filer
Attorneys

Patented Apr. 21, 1931

1,801,587

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

HYDRAULIC SHOCK ABSORBER OF DOUBLE-ACTING OPPOSED-CYLINDER TYPE

Application filed May 3, 1928. Serial No. 274,804.

This invention relates to improvements in shock absorbers adapted to cushion the movements of two relatively movable members, for example the frame and axle of a vehicle.

It is among the objects of the present invention to provide a shock absorber capable of resisting both the approaching and separating movements of the members between which the shock absorber is connected. A further object of the present invention is to provide a shock absorber of simple structure and design which may be produced at a minimum cost of labor and material and having compression chambers consisting of substantially non-porous metal so that the fluid therein will not leak or sweat-out from said compression chambers when comparatively high pressures are exerted thereupon.

Further objects and advantages of the present invention will be apparent from the following description, reference being had to the accompanying drawings, wherein a preferred embodiment of one form of the present invention is clearly shown.

Figure 1:
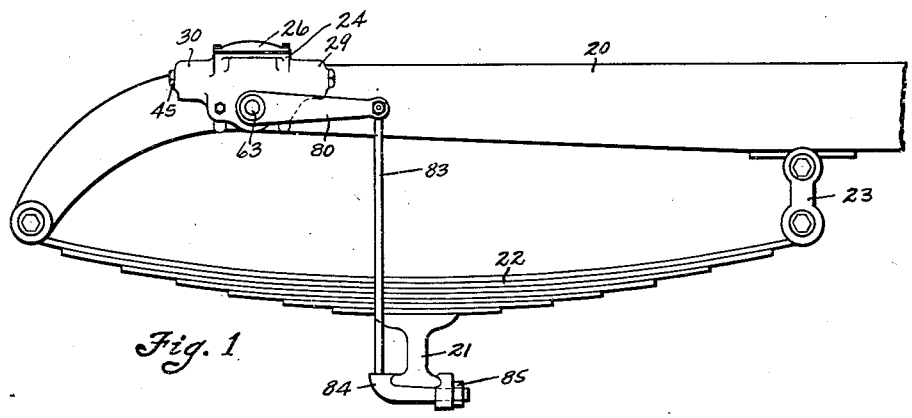
Fig. 1 is a diagrammatic fragmentary side view showing a portion of the vehicle frame and axle and one form of the present invention applied thereto.

Referring to the drawings, the shock absorber is shown attached to the frame 20 of the vehicle, and its operating arm designated by the numeral 80 is connected with a bracket 84 attached to the axle 21 by means of a clamping nut 85, the rigid link 83 acting as the connection between the operating arm 80 and the bracket 84.

The shock absorber comprises a casing 24 having two oppositely disposed cylindrical portions 29 and 30, substantially in axial alignment, said cylindrical portions forming a part of the fluid chamber 25 presented by the casing. Inasmuch as the shock absorber is of the double acting opposed cylinder type, the left hand side being substantially similar in construction as the right hand side, only the left hand side will be described for sake of brevity.

Figure 2:
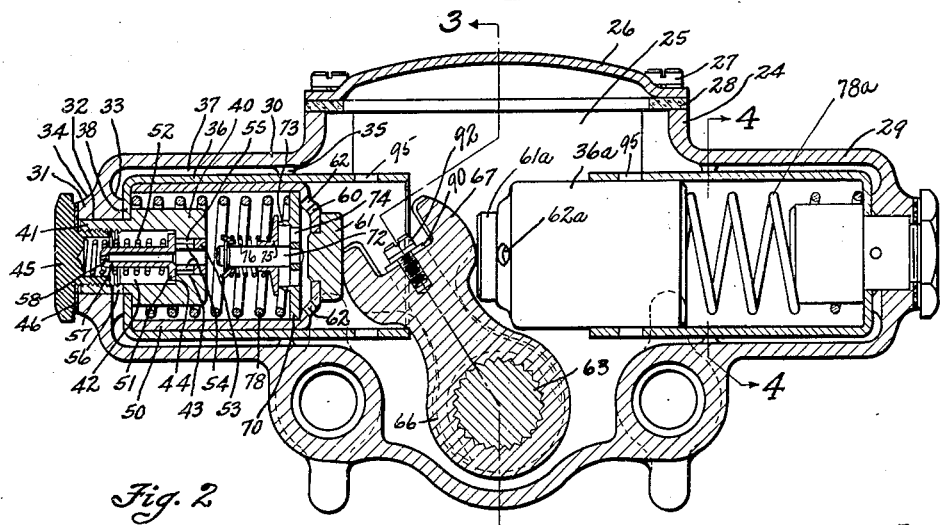
Fig. 2 is a longitudinal section through the shock absorber, portions thereof being shown in elevation for the sake of clearness.
Figure 3:
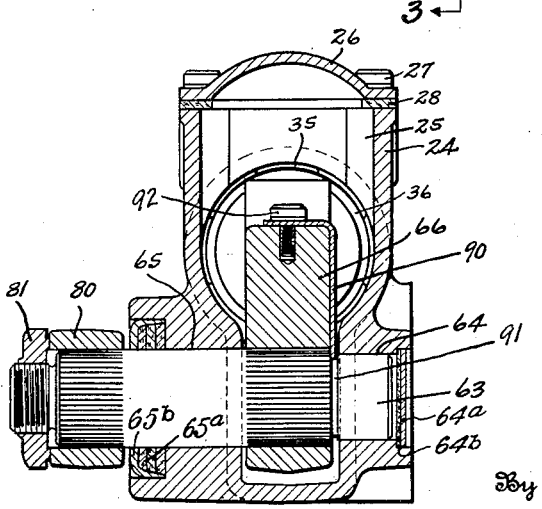
Fig. 3 is a transverse section taken along the line 3—3 of Fig. 2.
Figure 4:
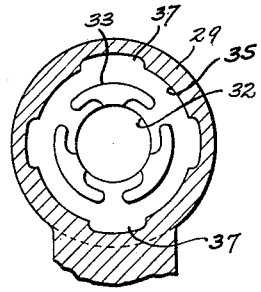
Fig. 4 is a detail fragmentary sectional view taken along the line 4—4 of Fig. 2.
Figure 5:
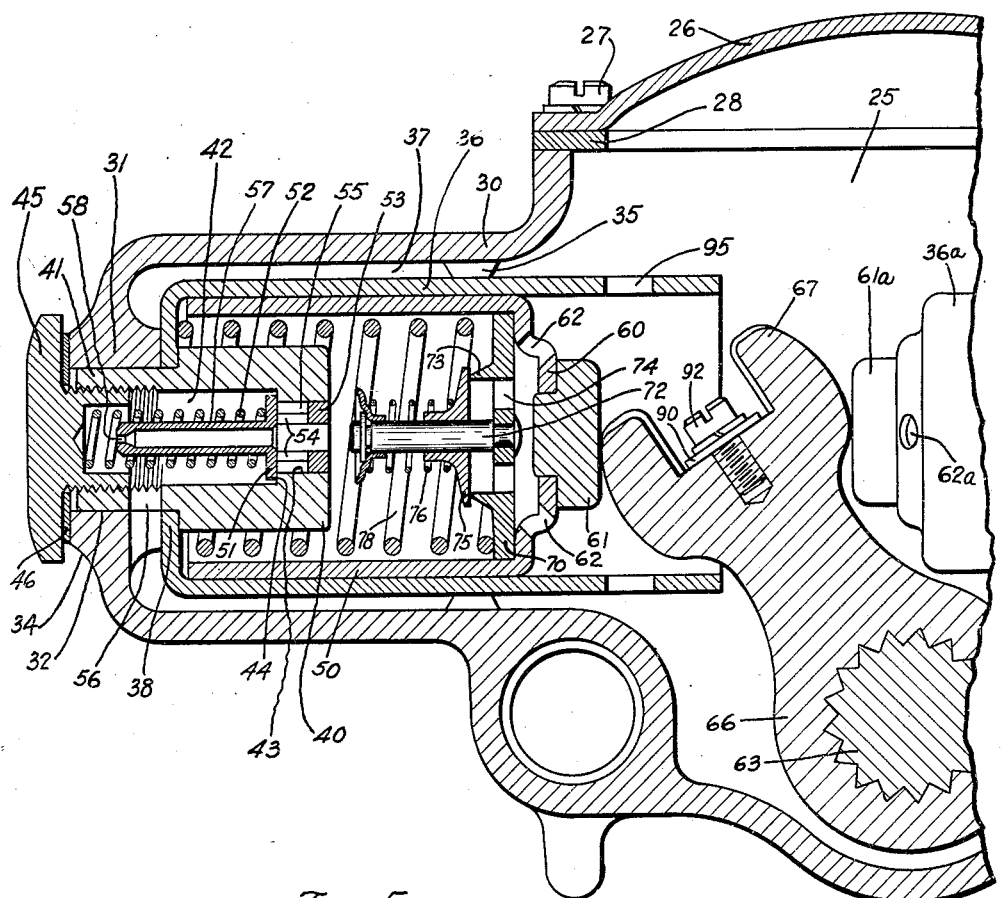
Fig. 5 is an enlarged view of substantially the left half of Fig. 2.

The cylindrical portion 30 has an outer end wall 34 provided with a lug 31 on its outer surface, the end wall having a central aperture 32. On the inner surface of the end wall there are provided spaced, inwardly extending lugs 33 which act as abutments for the end wall 38 of the cylinder 36, so that said cylinder is held in spaced relation with the end wall of the cylindrical portion 30. Adjacent the inner end of the cylindrical portion 30 there are provided spaced inwardly extending lugs 35 having inner faces substantially circular in form which support the inner end of the cylinder 36 whereby said cylinder is held substantially concentric with the cylindrical portion 30. The cylinder 36 is insertable into the cylindrical portion 30, and is preferably made up of pressed steel which is substantially non-porous and which will consequently prevent leaks or sweating-through of the fluid within said cylinder when said fluid is subjected to comparatively high pressures. The cylinder end wall 38 has a central aperture which aligns with the aperture 32 in the end wall of the cylindrical portion 30, the cylinder as shown in Fig. 2 being of lesser outside diameter than the inside diameter of the cylindrical portion 30, thus providing an annular space 37 around the cylinder with which the space between the lugs 33 communicates.

Within the cylinder 36 there is provided a member having a head portion 40 and a cylindrical portion 32 of lesser diameter than the head portion, said cylindrical portion extending through the aperture in the end wall 38 of the cylinder and into the aperture 32 in the cylindrical portion 30 of the casing. The member comprising portions 40 and 41 has a central longitudinal passage comprising a passage portion 43 of lesser diameter than the other passage portion 42 so that an offset or ledge 44 is formed which forms a valve seat within this head portion 40. Adjacent its outer end, passage 42 is provided with screw threads for receiving the screw threaded shank portion of a clamping screw 45 which when tightened causes the head 40 to draw the end wall 38 of the cylinder against lugs 33 tightly to clamp the cylinder 36 in position in the casing. A gasket 46 provided between the casing portion 30 and the clamping screw 45 prevents a leak at this joint.

Within the passages 42 and 43 there is provided a relief valve including a flanged portion 51 which is normally held against the ledge or valve seat 44 by a spring 52 interposed between the flange 51 and the clamping screw 46. Extending from the flange 44 of the valve and slidably supported within the passage 43 is a cylindrical portion 53 having an outer peripheral groove 55 which is in communication with the interior of the cylindrical portion by transverse passages 54, which, as may be seen in Fig. 2, are normally covered by the inner wall of the passage 43, thus communication between the interior of the cylindrical portion 53 of the valve and the passage 42 is normally shut off due to the valve flange 51 being held on a valve seat 44. Extending from the side of the valve flange 51 opposite the cylindrical portion 53 is a hollow valve stem 57 in communication with the cylindrical portion 53 of the valve, the end of the valve stem is provided with an orifice 58 for restricting the flow of fluid through the valve. The valve stem is surrounded by the spring 52 which normally holds the valve closed. This valve structure provides for the restricted flow of fluid from the cylinder 36 to the fluid chamber 25 when the piston moves in the one direction, more specifically in the direction toward the closed end of the cylinder.

The piston in this cylinder 36 is designated by the numeral 50, said piston having a head 60 provided with a hardened head-button 61. About this head-button 61 are provided a series of apertures 62 forming communication between the opposite sides of the piston head. The means for establishing a free flow of fluid from the fluid chamber into the cylinder when the piston moves in the other direction or in the direction toward the open end of the cylinder, comprises a valve including the disk-like valve seat member 70 adapted to engage with the inner wall of the piston head and having an annular flange 73. A stud 72 is secured in a central aperture provided in the plate 70, said plate having a plurality of apertures 74 about the central stud 72, all of said apertures 74 however lying within the confines of the annular flange 73. A valve 75 is slidably supported upon the valve stem 72, said valve being held in engagement with the edge of the annular flange 73 by a spring 76 which is interposed between the valve 75 and a retainer collar removably secured at the end of the stud 72. Interposed between the valve seat member 70 and the end wall 38 of the cylinder is a spring 78 which normally holds the valve seat member 70 in position against the inner surface of the piston head and at the same time holds the piston so that its head-button 61 is substantially in constant engagement with the head 67 of the operating rocker arm 66. The head-button 61a of the piston 36a, reciprocatively supported in the right hand cylinder, is held in engagement with the opposite side of the rocker arm head by means of a spring 78a. The rocker arm 66 is splined upon the rocker shaft 63, which is journalled in bearing portions 64 and 65 of the casing. The outer open end of bearing portion 64 is sealed against fluid leaks by a plug 64a provided with a gasket 64b. Bearing portion 65 has a recess in which is provided a packing 65a, forced into sealing engagement with the casing 24 and shaft 63 by the packing gland 65b. One end of the rocker shaft 63 extends outside the casing and has the shock absorber operating arm 80 splined thereon. The nut 81 is screw threaded upon the shaft 63 and maintains the operating arm 80 in position on said shaft. A locking plate 90 extends into a groove 91 in the rocker shaft 63, said locking plate being held in position on the rocker arm 66 by a screw 92. This locking plate substantially prevents the rocker arm 66 from moving longitudinally of shaft 63.

In operation the shock absorber is normally in such a position in which the rocker arm 66 is in substantially straight vertical position as regards Fig. 2, in this figure however the rocker arm is shown in the extreme left position into which it is moved when the spring 22 is completely flexed toward the frame 20 due to the road wheels striking an obstruction or bump in the roadway. Upon the movement of the rocker arm 67 into the postion as shown in Fig. 2, the piston 50 within the cylinder 36 will exert a pressure upon the fluid in this cylinder and cause it to flow through the valve portions 53, 57, orifice 58 into the chamber 42 thence through passages 56, 37 and passages between the lugs 35 into the fluid chamber, the orifice 58 restricting the flow of fluid and thus impeding the movement of the piston in this direction, consequently causing a re-active force to be exerted against the spring 22 in its flexing movement toward the frame 20. If the pressure upon the fluid within the cylinder 36 exceeds a certain value, the valve flange portion 51 will be moved off its seat, against the effect of spring 52, thus the groove 53 will be uncovered, partially, and fluid will then be permitted to flow from the interior of the cylindrical portion 53 through transverse passages 54, groove 55, through the space between the valve seat 44 and the valve flange 51 into the space 42 and thence with the fluid flowing from orifice 58 into the fluid chamber 25. The amount of opening between the valve seat 44 and its cooperating valve flange 51 is dependent upon the pressure exerted upon the fluid within the cylinder, for this opening tends to relieve the excessive pressure in the cylinder. When the spring 22 has reached its limit of flexure, it will return to its normal position causing the shock absorber arm 80 to rotate the rocker shaft 63 in a clockwise direction, thus moving piston 36a into its cylinder, the rocker arm 67 moving away from piston head-button 61 will permit the spring 78 to move the piston 50 toward the outer end of the cylinder, or more particularly to follow the movement of the rocker arm 67. When moving in this direction the valve 75 within the piston will be moved away from the valve-seat flange 73, against the effect of spring 76 and thus a free flow of fluid from the fluid chamber 25 through passages 62 and 74 and the space between the annular flange 73 and the valve member 75 into the cylinder will be effected. Of course it will be understood that this valve will close immediately upon reverse movement of the piston.

In order to meet the different requirements of the various vehicles upon which these shock absorbers may be attached, the valves including portions 53, 57 and orifice 58 as well as the springs 52 associated therewith may be altered to vary the fluid pressures necessary to relieve internal pressures in the compression chambers. If stiffer springs 52 are used, then the shock absorber will exert a greater counteracting force against the spring action while the opposite is true if less stiff spring be used. On the other hand if a valve having a larger orifice 58 is used, then lesser initial resistance to the spring action will obtain.

The casing 24 is closed by means of cover 26 attached to the casing by means of screws 27, a gasket 28 being provided between the cover and the casing substantially to eliminate leaks.

The casing is so constructed that the cylinders may be separately inserted within their housing portions while the pistons are maintained therein. In order to hold the pistons within the cylinder against effect of the springs 78 and 78a while said cylinders are being inserted, apertures 95 are provided in the cylinders adjacent the open ends through which pins may be inserted for holding the pistons in their inner position while the shock absorber is being assembled. These pins may be removed after the cylinders have been placed in position in the casing and the rocker arm has been properly located.

The present invention presents a shock absorber which includes a steel cylinder providing a compression chamber substantially leak-proof, the design of the shock absorber being such that assembling thereof is greatly facilitated. If for any reason the valves in the shock absorber are to be changed, removal of the nuts 45 is all that is required to render the valves accessible. Inasmuch as all high pressures are confined within steel cylinders, it may be seen that fluid leaks usually present in devices of this kind are substantially eliminated.

While the form of embodiment of the present invention as herein disclosed constitutes a preferred form, it is to be understood that other forms might be adopted, all coming within the scope of the claims which follow.

What is claimed is as follows:

1. A shock absorber for cushioning the movement of two relatively movable members, comprising in combination, a casing presenting a fluid chamber, cylinders in said fluid chamber, a piston in each cylinder, means for securing the cylinders to the casing, said means having instrumentalities adapted to control the flow of fluid from the cylinders to the fluid chamber in response to the movement of the respective pistons in one direction, and means extending into the casing for operating the pistons.

2. A shock absorber for cushioning the movement of two relatively movable members, comprising in combination, a casing presenting a fluid chamber, oppositely disposed cylinders in said casing, each cylinder having an apertured end wall engaging an inner wall surface of the casing, a piston in each cylinder, clamping means extending through the apertured end wall of each cylinder and the casing wall adjacent thereto for securely attaching the cylinders to the respective casing walls, said clamping means having instrumentalities adapted to control the flow of fluid from the respective cylinders to the fluid chamber in response to the movement of the pistons in one direction, and means extending into the casing for operating the pistons.

3. A shock absorber for cushioning the movement of two relatively movable members, comprising in combination, a casing presenting a fluid chamber, cylinders in said casing, a piston in each cylinder, means for attaching one end of each cylinder to a casing wall, said means including instrumentalities adapted to control the flow of fluid from the respective cylinders to the fluid chamber in response to the movement of the pistons in one direction, means within the casing engaging the respective cylinders adjacent their free ends, for supporting said pistons, and means extending into the casing for operating the pistons.

4. A shock absorber for cushioning the movement of two relatively movable members, comprising in combination, a casing presenting a fluid chamber having oppositely disposed cylindrical portions, a cylinder in each of said cylindrical portions, a piston in each cylinder, means for securing the cylinders in their respective cylindrical portions of the casing, said means including instrumentalities adapted to control the flow of fluid from the respective cylinders to the fluid chamber in response to the movement of the pistons in one direction, and means extending into the casing for operating the pistons.

5. A shock absorber for cushioning the movement of two relatively movable members, comprising in combination, a casing presenting a fluid chamber having oppositely disposed cylindrical portions provided with outer end walls, a cylinder in each of said cylindrical portions, a piston in each cylinder, means for rigidly securing one end of each cylinder to the end wall of the respective cylindrical portions of the casing, said means including instrumentalities for controlling the flow of fluid from the cylinders to the fluid chamber in response to the movement of the respective pistons in the one direction, means in each cylindrical portion of the casing, engaging the respective cylinders to support them adjacent their free ends, and means extending into the casing for operating the pistons.

6. A shock absorber for cushioning the movement of two relatively movable members, comprising in combination, a casing presenting a fluid chamber having oppositely disposed cylindrical portions provided with centrally apertured, outer end walls, a cylinder in each of said cylindrical portions, each cylinder having an apertured end wall adapted to engage the end wall of its respective cylindrical casing portion, the apertures of both end walls aligning, a piston in each cylinder, means extending through the apertures of each cylinder end wall, and the end wall of its respective casing portion, for securely clamping the cylinders to their respective casing portions, said means including instrumentalities for controlling the flow of fluid from the respective cylinders to the fluid chamber, and means extending into the casing for operating the pistons.

7. A shock absorber for cushioning the movement of two relatively movable members, comprising in combination, a casing presenting a fluid chamber having oppositely disposed cylindrical portions provided with centrally apertured, outer end walls, a cylinder in each of said cylindrical portions, each cylinder having an apertured end wall adapted to engage the end wall of its respective cylindrical casing portion, the apertures of both end walls aligning, a piston in each cylinder, means extending through the apertures of each cylinder end wall and the end wall of its respective casing portion, for securely clamping the cylinders to their respective casing portions, said means including instrumentalities for controlling the flow of fluid from the respective cylinders to the fluid chamber, spaced means extending from the cylindrical portions of the casing and engaging the respective cylinders to support them adjacent their free ends, and means extending into the casing and engaging the pistons to operate them.

8. A shock absorber for cushioning the movement of two relatively movable members, comprising in combination, a casing for presenting a fluid chamber, cylinders in said fluid chamber, means in each cylinder for attaching it to the casing wall, a piston in each cylinder, a check valve in each of said aforementioned means for establishing a restricted flow of fluid from the respective cylinder to the fluid chamber in response to the movement of the pistons in one direction, a valve in each piston for establishing a free flow of fluid from the fluid chamber to the respective cylinders in response to the movement of the pistons in the other direction, and means extending into the casing for operating the pistons.

9. A shock absorber for cushioning the movement of two relatively movable members, comprising in combination, a casing presenting a fluid chamber, cylinders in said fluid chamber, a piston in each cylinder, a check valve for each cylinder having a valve member, a valve seat member and a spring for maintaining the valve upon the valve seat, the valve seat member comprising two portions adapted to cooperate rigidly to attach the respective cylinders to the casing walls, each check valve being adapted to establish a restricted flow of fluid from the respective cylinder to the fluid chamber in response to the movement of the piston in one direction, a valve in each piston for establishing a free flow of fluid from the fluid chamber into the respective cylinders in response to the movement of the pistons in the other direction, and means extending into the casing for operating the piston.

10. A shock absorber for cushioning the movement of two relatively movable members, comprising in combination, a casing presenting a fluid chamber having two oppositely disposed, axially aligned cylindrical portions provided with centrally apertured outer end walls, a cylinder, smaller in diameter than the interior diameter of the cylindrical portions, provided in each of said portions, each cylinder having a centrally apertured end wall engaging the end wall of its respective cylindrical portion of the casing, a piston in each cylinder, a hollow valve seat member within each cylinder, each having a reduced shank portion extending through the apertures in the end walls of the respective cylinders and into the apertures of the end walls of the respective cylindrical portions of the casing, a nut screw-threadedly engaging each of said shank portions and adapted, when tightened, to clamp the respective cylinders to their casing walls so that said cylinders are held coaxial with and in spaced relation to the inner walls of said cylindrical portions, a spring loaded check valve in each valve seat member, adapted to establish a free flow of fluid from the cylinders into their respective surrounding spaces and into the fluid chamber in response to the movement of the piston in one direction, spaced lugs on the interior of each cylindrical portion, engaging the cylinders adjacent their free ends to support the same, a valve in each piston adapted to establish a free flow of fluid into the cylinders in response to the movement of the pistons in the other direction, and means extending into the casing for operating the pistons.

11. An hydraulic shock absorber comprising, in combination, a casing providing a fluid reservoir; a cylinder in said reservoir; a piston in said cylinder; a valve in the piston adapted to establish a flow of fluid from the reservoir into the cylinder in response to the movement of the piston in one direction; means extending coaxially through the cylinder and an end wall of the reservoir for securing the cylinder rigidly within the reservior means provided by said aforementioned means for establishing a flow of fluid from the cylinder into the reservoir in response to the movement of the piston in the other direction; and means for operating the piston.

12. An hydraulic shock absorber comprising, in combination, a casing providing a fluid reservoir; a cylinder within said reservoir; a piston in said cylinder; means for operating the piston; telescopically engaging means extending coaxially through the adjacent end walls of the reservoir and cylinder and adapted to be secured together rigidly to fasten the cylinder in proper position within the reservoir; means encased by said telescopically engaging means for establishing restricted flows of fluid from the cylinder into the reservoir in response to movement of the piston to reduce the cubical contents of the cylinder; and means for establishing a flow of fluid from the reservoir into the cylinder when the piston is moved to increase the cubical contents of the cylinder.

13. An hydraulic shock absorber comprising, in combination, a casing providing a fluid reservoir; a cylinder within said reservoir; a piston in said cylinder; means for operating the piston; means telescopically engaging to secure the cylinder in proper position within the reservoir; means within said telescopically engaging means, immovable to establish a restricted flow of fluid from the cylinder into the reservoir in response to the movement of the piston in one direction, and movable to establish a lesser restricted flow from the cylinder into the reservoir in response to more extensive movements of the piston in the said, one direction; and means for establishing a substantially free flow of fluid from the reservoir into the cylinder in response to the movement of the piston in the other direction.

14. An hydraulic shock absorber comprising, in combination, a casing presenting a fluid reservoir having a cylindrical portion; spaced lugs extending from the annular and end walls of the cylindrical portion of the casing; a cylinder supported between said spaced lugs so as to provide a space about the annular and end walls of the cylinder; anchoring means for securing the cylinder within the casing, said means providing communication between the interior of the cylinder and the space about said cylinder; a piston in the cylinder; means for reciprocating said piston; and valve mechanism within said anchoring means, said valve mechanism being immovable to establish a restricted flow of fluid from the cylinder into the space about the cylinder in response to certain movements of the piston, and movable to establish a lesser restricted flow from the cylinder into the reservoir in response to more extensive movement of the piston to exert pressure upon the fluid in the cylinder.

In testimony whereof I hereto affix my signature.

WILLIAM A. CHRYST.